US012253228B2

(12) United States Patent
Galander et al.

(10) Patent No.: US 12,253,228 B2
(45) Date of Patent: Mar. 18, 2025

(54) LIGHTING DEVICE FOR A MOTOR VEHICLE HEADLIGHT

(71) Applicant: ZKW Group GmbH, Wieselburg (AT)

(72) Inventors: Ulrich Galander, Dunkelsteinerwald (AT); Jakob Pühringer, Vienna (AT); Benedikt Krist, Guntramsdorf (AT)

(73) Assignee: ZKW Group GmbH, Wieselburg (AT)

(*) Notice: Subject to any disclaimer, the term of this patent is extended or adjusted under 35 U.S.C. 154(b) by 0 days.

(21) Appl. No.: 18/578,548

(22) PCT Filed: Jun. 20, 2022

(86) PCT No.: PCT/EP2022/066693
§ 371 (c)(1),
(2) Date: Jan. 11, 2024

(87) PCT Pub. No.: WO2023/001462
PCT Pub. Date: Jan. 26, 2023

(65) Prior Publication Data

US 2024/0318798 A1 Sep. 26, 2024

(30) Foreign Application Priority Data

Jul. 20, 2021 (EP) .................................... 21186669

(51) Int. Cl.
*F21S 41/24* (2018.01)
*F21S 41/143* (2018.01)
(Continued)

(52) U.S. Cl.
CPC ............ *F21S 41/24* (2018.01); *F21S 41/143* (2018.01); *F21S 41/255* (2018.01);
(Continued)

(58) Field of Classification Search
CPC ........ F21S 41/24; F21S 41/663; F21S 41/143; F21S 41/255; F21S 41/68; F21W 2102/145
See application file for complete search history.

(56) References Cited

U.S. PATENT DOCUMENTS 10,018,317 B2 * 7/2018 Taudt .................... F21S 41/285
2008/0080201 A1 * 4/2008 Specht .................. F21S 41/143
362/507
(Continued)

FOREIGN PATENT DOCUMENTS

CN 209688723 U 11/2019
DE 102017212095 A1 1/2019
(Continued)

OTHER PUBLICATIONS

Search Report and Written Opinion for International Patent Application No. PCT/EP2022/066693 dated Aug. 8, 2022 (13 Pages).

*Primary Examiner* — Erin Kryukova
(74) *Attorney, Agent, or Firm* — Eversheds Sutherland (US) LLP

(57) ABSTRACT

Illumination device (10) for a motor vehicle headlight for producing segmented full beam distribution (FL), wherein the illumination device (10) comprises the following for this purpose:

Figure 1:
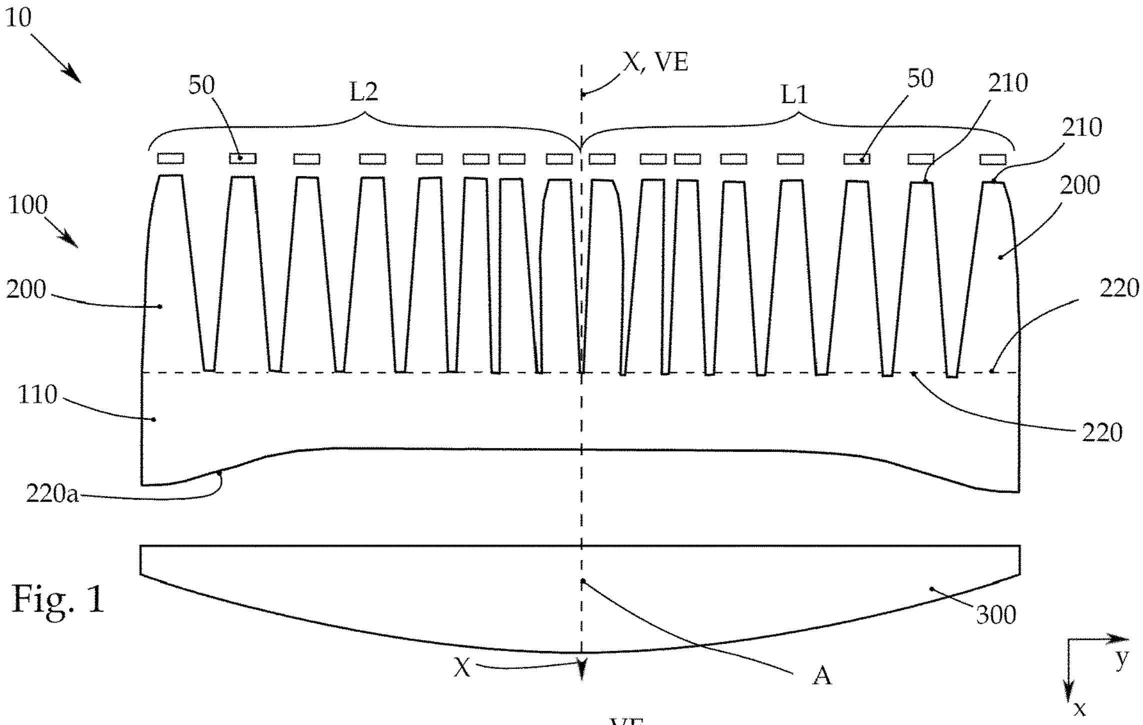

an optical element (100), comprising light guiding bodies (200) for forming the definable segment full beam distribution (FL), which light guiding bodies (200) respectively have a light entry surface (210) and an exit surface (220), projection optics (300) arranged downstream of the beam path of the optical element (100) having an optical axis (A), which projection optics (300) are designed to project the light exiting from the common exit surface (Continued)

(200*a*) in front of the illumination device (10) in the direction of a main emission direction (X), and wherein each light guiding body (200) has two lateral side surfaces (230*a*, 230*b*) and an upper and a lower side surface (240*a*, 240*b*), wherein the optical element (100) has a first and a second light emission half (L1, L2), which can be delimited from one another by a virtual vertical plane (VE), wherein the first light guiding body (200*a*) of the first light emission half (L1) helps produce the first maximum illuminance (M1), and wherein the first light guiding body (200*b*) of the second light emission half (L2) helps produce the second maximum illuminance (M2), wherein the surface centre (FM2) of the entry surface (210) has a horizontal offset (H-off) and a downwards vertical offset (V-off) to the surface centre (FM1) of the associated exit surface (220), and wherein the lateral side surface (230*a*) of these first light guiding bodies (200*a*, 200*b*), which faces away from the virtual vertical plane (VE), is convex and combined with the offset of the entry surfaces (210) is designed to direct light from the corresponding light source (50) in the direction of the optical axis (A) in order to increase the illuminance between the first and the second maximum illuminance (M1, M2) in the full beam distribution (FL) such that the intersection HV of an aiming screen is arranged within the isolux line for 80% of the maximum illuminance of the full beam distribution (FL).

13 Claims, 1 Drawing Sheet

(51) Int. Cl.

| | |
|---|---|
| ***F21S 41/255*** | (2018.01) |
| ***F21S 41/663*** | (2018.01) |
| ***F21S 41/68*** | (2018.01) |
| ***F21W 102/145*** | (2018.01) |

(52) U.S. Cl.

CPC ............ *F21S 41/663* (2018.01); *F21S 41/68* (2018.01); *F21W 2102/145* (2018.01)

(56) References Cited

U.S. PATENT DOCUMENTS

| | | | | |
|---|---|---|---|---|
| 2009/0016074 | A1 | 1/2009 | Dolson et al. | |
| 2015/0167913 | A1* | 6/2015 | Stefanov | F21S 41/663 362/511 |
| 2016/0265732 | A1 | 9/2016 | Jacquemin et al. | |
| 2020/0103086 | A1 | 4/2020 | Zozgornik | |
| 2021/0180760 | A1* | 6/2021 | Aubert | F21S 41/663 |
| 2021/0381669 | A1 | 12/2021 | Marchal | |

FOREIGN PATENT DOCUMENTS

| | | | | |
|---|---|---|---|---|
| EP | 3388734 | A1 | 10/2018 | |
| EP | 3584496 | A1 * | 12/2019 | B60Q 1/0011 |
| WO | WO-2021244735 | A1 * | 12/2021 | F21S 41/143 |

* cited by examiner

LIGHTING DEVICE FOR A MOTOR VEHICLE HEADLIGHT

The invention relates to an illumination device for a motor vehicle headlight for producing segmented full beam distribution, wherein the full beam distribution has a first and a second maximum illuminance, which are designed and arranged in the full beam distribution in such a way that an intersection HV of the horizontal line H-H and the vertical line V-V of an aiming screen for measuring a light distribution is arranged within an isolux line for 80% of the maximum illuminance of the full beam distribution, wherein the illumination device comprises the following for this purpose:

- an optical element, comprising a base body and a plurality of light guiding bodies protruding from the base body for forming the definable segmented full beam distribution from the light of light sources, which light guiding bodies respectively have a light entry surface, into which light can be fed from the light sources, and an exit surface, from which exit surface light that can be fed into the respective light guiding body exits, wherein the exit surfaces of adjacent light guiding bodies are directly adjacent to one another and form a common exit surface of the optical element, wherein the light guiding bodies of the optical element are arranged in at least one row along a straight line,
- a plurality of light sources, wherein at least one light source is respectively associated with an entry surface of a light guiding body,
- projection optics arranged downstream of the beam path of the optical element having an optical axis, which projection optics are designed to project the light exiting from the common exit surface in front of the illumination device in the direction of a main emission direction, wherein the optical axis of the projection optics intersects the intersection HV, and wherein the optical axis is parallel to the main emission direction of the illumination device, wherein a first and second virtual axis are arranged orthogonally to the main emission direction, wherein the first and second virtual axis are also aligned orthogonally to one another, wherein in a properly installed condition of the illumination device in a motor vehicle headlight, the first axis is arranged in a horizontal plane and the second axis is arranged in a vertical plane, and wherein each light guiding body, as seen in a properly installed condition of the illumination device in a motor vehicle, has two lateral side surfaces and an upper and a lower side surface, which side surfaces extend from the entry surface in the direction of the common exit surface and delimit the light guiding body at least in sections.

The invention further relates to a motor vehicle headlight having at least one illumination device according to the invention.

Due to a statutory ECE regulation, a light distribution must provide for the intersection HV to be arranged within an isolux line for 80% of the maximum illuminance of the full beam distribution.

This limits the design options for illumination devices or motor vehicle headlights; in particular in the case of segmented full beam distributions, this leads to huge restrictions.

It is an object of the invention to provide an improved illumination device.

This object is achieved by virtue of the fact that the optical element has a first and a second light emission half, which, as seen in a properly installed condition of the illumination device in a motor vehicle, can be delimited from one another by a virtual vertical plane, which runs through the optical element and in which vertical plane the optical axis of the projection optics lies, wherein the first light emission half is arranged on a first side of the virtual vertical plane, and wherein the second light emission half is arranged on a second side opposite the first side,

- wherein the first light guiding body of the first light emission half, which is directly adjacent to the virtual vertical plane, helps produce the first maximum illuminance of the full beam distribution, and wherein
- the first light guiding body of the second light emission half, which is directly adjacent to the virtual vertical plane, helps produce the second maximum illuminance of the full beam distribution,
- wherein the entry surfaces of these first light guiding bodies respectively have an offset from the corresponding exit surface such that the surface centre of the entry surface has a horizontal offset, directed away from the virtual vertical plane, along the first axis, which runs orthogonally to the virtual vertical plane, and a downwards vertical offset along the second axis to the surface centre of the associated exit surface,
- and wherein the lateral side surface of these first light guiding bodies, which faces away from the virtual vertical plane, is convex and combined with the offset of the entry surfaces is designed to direct light from the corresponding light source in the direction of the optical axis in order to increase the illuminance between the first and the second maximum illuminance in the full beam distribution such that the intersection HV of an aiming screen is arranged within the isolux line for 80% of the maximum illuminance of the full beam distribution.

It can be provided that the lateral side surface of these first light guiding bodies that is directed towards the virtual vertical plane is concave.

It can be provided that the upper side surface of these first light guiding bodies is curved, preferably concave.

It can be provided that the lower side surface of these first light guiding bodies is curved, preferably convex.

It can be provided that the entry surfaces of the light guiding bodies are arranged in a common vertical plane, which vertical plane is arranged orthogonal to the main emission direction.

It can be provided that the plurality of light sources are designed as light-emitting diodes.

It can be provided that the light-emitting diodes can be controlled independently of one another, can preferably be switched on and off independently of one another, in particular can be dimmed independently of one another.

It can be provided that the light guiding bodies of the optical element are arranged in exactly one row along a straight line, wherein the straight line is preferably orthogonal to the optical axis of the projection optics.

The object is also achieved by a motor vehicle headlight having at least one illumination device according to the invention.

Figure 2:
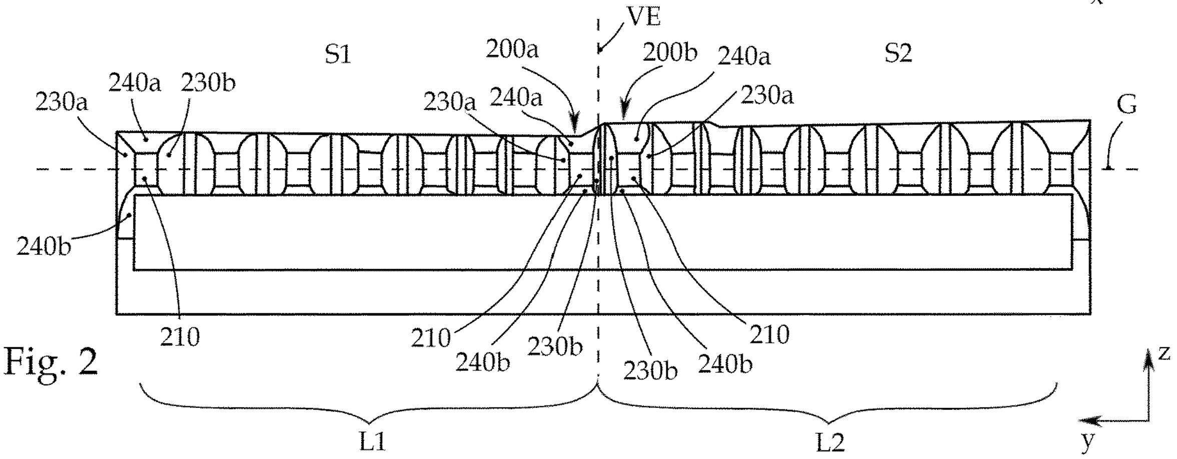
Figure 3:
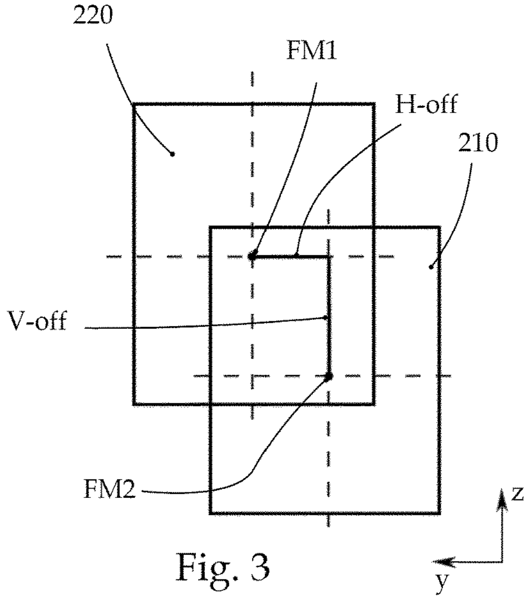

The invention is explained below in more detail based on exemplary drawings. In the drawings, FIG. 1 shows a view from above of an exemplary illumination device, comprising an optical element having a plurality of light guiding elements, into which light can be fed from light sources, and projection optics arranged downstream of the optical element for producing segmented full beam distribution, FIG. 2 shows a rear view of the exemplary illumination device shown in FIG. 1, FIG. 3 shows a schematic representation of an offset of the light entry and light exit surface of a light guiding body, and FIG. 4 shows an exemplary segmented full beam distribution that can be produced by the illumination device shown in FIG. 1 with two maximum illuminance values.

Figure 4:
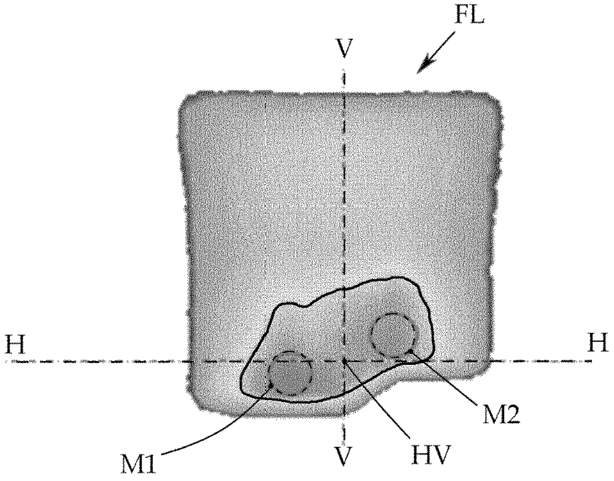

FIG. 1 shows an exemplary illumination device 10 for a motor vehicle headlight for producing segmented full beam distribution FL, wherein the full beam distribution FL has a first and a second maximum illuminance M1, M2, which are designed and arranged in the full beam distribution FL in such a way that an intersection HV of the horizontal line H-H and the vertical line V-V of an aiming screen for measuring a light distribution is arranged within an isolux line for 80% of the maximum illuminance of the full beam distribution FL, which light distribution FL is shown in FIG. 4.

This requirement refers to the statutory ECE regulation, for example, as set out in Official Journal of the European Union L 250/82.

In general, isolux lines indicate the distribution of the corresponding illuminance on a visible surface, wherein points of equal illuminance are connected by curves, namely the isolux lines.

In the example shown, the illumination device 10 comprises a plurality of light sources 50 and an optical element 100, comprising a base body 110 and a plurality of light guiding bodies 200 protruding from the base body 110 for forming the definable segmented full beam distribution FL from the light of the light sources 50, which light guiding bodies 200 respectively have a light entry surface 210, into which light can be fed from the light sources 50, and an exit surface 220, from which exit surface 220 light that can be fed into the respective light guiding body 200 exits, wherein the exit surfaces 220 of adjacent light guiding bodies 200 are directly adjacent to one another and form a common exit surface 220*a* of the optical element 100, wherein the light guiding bodies 200 of the optical element 100 are arranged in exactly one row along a straight line G, which straight line G is orthogonal to the optical axis A of the projection optics.

A light source 50 is respectively associated with an entry surface 210 of a light guiding body 200. The plurality of light sources 50 are designed as light-emitting diodes, wherein the light-emitting diodes can be controlled independently of one another, can preferably be switched on and off independently of one another, in particular can be dimmed independently of one another.

Furthermore, the entry surfaces 210 of the light guiding bodies 200 are arranged in a common vertical plane (as seen in a properly installed condition of the illumination device 10 in a motor vehicle), which vertical plane is arranged orthogonal to the main emission direction X.

Furthermore, the illumination device 10 comprises projection optics 300 arranged downstream of the beam path of the optical element 100 and which can, for example, comprise one or more projection lenses, having an optical axis A, which projection optics 300 are designed to project the light exiting from the common exit surface 200*a* in front of the illumination device 10 in the direction of a main emission direction X, wherein the optical axis A of the projection optics 300 intersects the intersection HV, and wherein the optical axis A is parallel to the main emission direction X of the illumination device 10.

Furthermore, a first and second virtual axis y, z are arranged orthogonally to the main emission direction X, wherein the first and second virtual axis y, z are also aligned orthogonally to one another, wherein in a properly installed condition of the illumination device 10 in a motor vehicle headlight, the first axis y is arranged in a horizontal plane and the second axis y is arranged in a vertical plane.

Moreover, each light guiding body 200, as seen in a properly installed condition of the illumination device 10 in a motor vehicle, has two lateral side surfaces 230*a*, 230*b* and an upper and a lower side surface 240*a*, 240*b*, which side surfaces 230*a*, 230*b*, 240*a*, 240*b* extend from the entry surface 210 in the direction of the common exit surface 220*a* and delimit the light guiding body 200 at least in sections.

As shown in FIG. 1 and FIG. 2, the optical element 100 has a first and a second light emission half L1, L2, which, as seen in a properly installed condition of the illumination device 10 in a motor vehicle, can be delimited from one another by a virtual vertical plane VE, which is determined by the axis of the main emission direction X and second axis z and runs through the optical element 100 and in which vertical plane VE the optical axis A of the projection optics 300 lies.

Each light emission half L1, L2 has the same number of light guiding bodies 200.

The first light emission half L1 is arranged on a first side S1 of the virtual vertical plane VE, and wherein the second light emission half L2 is arranged on a second side S2 opposite the first side S1.

The first light guiding body 200*a* of the first light emission half L1, which is directly adjacent to the virtual vertical plane VE, helps produce the first maximum illuminance M1 of the full beam distribution FL, wherein the first light guiding body 200*a* of the second light emission half L2, which is directly adjacent to the virtual vertical plane VE, helps produce the second maximum illuminance M2 of the full beam distribution FL.

The entry surfaces 210 of these first light guiding bodies 200*a*, 200*b* respectively have an offset, in particular a parallel offset, from the corresponding exit surface 220 such that the surface centre FM2 of the entry surface 210 has a horizontal offset H-off, directed away from the virtual vertical plane VE, along the first axis y, which runs orthogonally to the virtual vertical plane VE, and a downwards vertical offset V-off along the second axis z to the surface centre FM1 of the associated exit surface 220. This is clearly illustrated in particular in FIG. 3.

The lateral side surface 230*a* of these first light guiding bodies 200*a*, 200*b*, which faces away from the virtual vertical plane VE, is convex and combined with the offset of the entry surfaces 210 is designed to direct light from the corresponding light source 50 in the direction of the optical axis A in order to increase the illuminance between the first and the second maximum illuminance M1, M2 in the full beam distribution FL such that the intersection HV of an aiming screen is arranged within the isolux line for 80% of the maximum illuminance of the full beam distribution FL.

Furthermore, the lateral side surface 230*b* of these first light guiding bodies 200*a*, 200*b* that is directed towards the virtual vertical plane VE is concave. Moreover, the upper side surface 240*a* of these first light guiding bodies 200*a*, 200*b* is curved, preferably concave. The lower side surface 240*b* of these first light guiding bodies 200*a*, 200*b* is curved, preferably convex.

This further intensifies the increase in illuminance between the maximum illuminance values M1, M2.

REFERENCE LIST

Illumination device . . . 10
Light source . . . 50

Optical element . . . 100
Base body . . . 110
Light guiding body . . . 200
First light guiding body . . . 200*a*, 200*b*
Light entry surface . . . 210
Light exit surface . . . 220
Common light exit surface . . . 220*a*
Lateral side surfaces . . . 230*a*, 230*b*
Upper side surface . . . 240*a*
Lower side surface . . . 240*b*
Projection optics . . . 300
Main emission direction . . . X
Optical axis . . . A
Straight line . . . G
Full beam distribution . . . FL
First light emission half . . . L1
Second light emission half . . . L2
First maximum illuminance . . . M1
Second maximum illuminance . . . M2
First side . . . S1
Second side . . . S2
Virtual vertical plane . . . VE
Horizontal offset . . . H-off
Vertical offset . . . V-off

The invention claimed is:

1. An illumination device (10) for a motor vehicle headlight for producing segmented full beam distribution (FL), wherein the full beam distribution (FL) has a first and a second maximum illuminance (M1, M2), which are designed and arranged in the full beam distribution (FL) in such a way that an intersection HV of the horizontal line H-H and the vertical line V-V of an aiming screen for measuring a light distribution is arranged within an isolux line for 80% of the maximum illuminance of the full beam distribution (FL), wherein the illumination device (10) comprises:

a plurality of light sources (50);

an optical element (100), comprising a base body (110) and a plurality of light guiding bodies (200) protruding from the base body (110) for forming the segmented full beam distribution (FL) from the light of the plurality of light sources (50), which light guiding bodies (200) respectively have a light entry surface (210), into which light can be fed from the light sources (50), wherein at least one light source of the plurality of light sources (50) is respectively associated with the entry surface (210), and an exit surface (220), from which exit surface (220) light that can be fed into the respective light guiding body (200) exits, wherein the exit surfaces (220) of adjacent light guiding bodies (200) are directly adjacent to one another and form a common exit surface (220*a*) of the optical element (100), wherein the light guiding bodies (200) of the optical element (100) are arranged in at least one row along a straight line (G); and projection optics (300) arranged downstream of the beam path of the optical element (100) having an optical axis (A), which projection optics (300) are designed to project the light exiting from the common exit surface (200*a*) in front of the illumination device (10) in the direction of a main emission direction (X), wherein the optical axis (A) of the projection optics (300) intersects the intersection HV, and wherein the optical axis (A) is parallel to the main emission direction (X) of the illumination device (10), wherein a first and second virtual axis (y, z) are arranged orthogonally to the main emission direction (X), wherein the first and second virtual axis (y, z) are also aligned orthogonally to one another, wherein the illumination device (10) is configured to be installed in a motor vehicle headlight such that the first axis (y) is arranged in a horizontal plane and the second axis (z) is arranged in a vertical plane, wherein when the illumination device (10) is installed in the motor vehicle headlight, each light guiding body (200) has two lateral side surfaces (230*a*, 230*b*) and an upper and a lower side surface (240*a*, 240*b*), which side surfaces (230*a*, 230*b*, 240*a*, 240*b*) extend from the entry surface (210) in the direction of the common exit surface (220*a*) and delimit the light guiding body (200) at least in sections, wherein the optical element (100) has a first and a second light emission half (L1, L2), which, when the illumination device (10) is installed in the motor vehicle headlight, can be delimited from one another by a virtual vertical plane (VE), which runs through the optical element (100) and in which vertical plane (VE) the optical axis (A) of the projection optics (300) lies, wherein the first light emission half (L1) is arranged on a first side (S1) of the virtual vertical plane (VE), and wherein the second light emission half (L2) is arranged on a second side (S2) opposite the first side (S1), wherein a first light guiding body (200*a*) of the first light emission half (L1), which is directly adjacent to the virtual vertical plane (VE), produces the first maximum illuminance (M1) of the full beam distribution (FL), wherein a first light guiding body (200*b*) of the second light emission half (L2), which is directly adjacent to the virtual vertical plane (VE), produces the second maximum illuminance (M2) of the full beam distribution (FL), wherein the entry surfaces (210) of these first light guiding bodies (200*a*, 200*b*) respectively have an offset from the corresponding exit surface (220) such that the surface centre (FM2) of the entry surface (210) has a horizontal offset (H-off), directed away from the virtual vertical plane (VE), along the first axis (y), which runs orthogonally to the virtual vertical plane (VE), and a downwards vertical offset (V-off) along the second axis (z) to the surface centre (FM1) of the associated exit surface (220), and wherein the lateral side surface (230*a*) of these first light guiding bodies (200*a*, 200*b*), which faces away from the virtual vertical plane (VE), is convex and combined with the offset of the entry surfaces (210) is designed to direct light from the corresponding light source (50) in the direction of the optical axis (A) in order to increase the illuminance between the first and the second maximum illuminance (M1, M2) in the full beam distribution (FL) such that the intersection HV of an aiming screen is arranged within the isolux line for 80% of the maximum illuminance of the full beam distribution (FL).

2. The illumination device according to claim 1, wherein the lateral side surface (230*b*) of these first light guiding bodies (200*a*, 200*b*) that is directed towards the virtual vertical plane (VE) is concave.

3. The illumination device according to claim 1, wherein the upper side surface (240*a*) of these first light guiding bodies (200*a*, 200*b*) is curved.

4. The illumination device according to claim 3, wherein the upper side surface (240*a*) of these first light guiding bodies (200*a*, 200*b*) is concave.

5. The illumination device according to claim 1, wherein the lower side surface (240*b*) of these first light guiding bodies (200*a*, 200*b*) is curved.

6. The illumination device according to claim 5, wherein the lower side surface (240*b*) of these first light guiding bodies (200*a*, 200*b*) is convex.

7. The illumination device according to claim 1, wherein the entry surfaces (210) of the light guiding bodies (200) are arranged in a common vertical plane, which vertical plane is arranged orthogonal to the main emission direction (X).

8. The illumination device according to claim 1, wherein the plurality of light sources (50) are designed as light-emitting diodes.

9. The illumination device according to claim 8, wherein the light-emitting diodes can be controlled independently of one another.

10. The illumination device according to claim 9, wherein the light-emitting diodes can be switched on and off independently of one another.

11. The illumination device according to claim 9, wherein the light-emitting diodes can be dimmed independently of one another.

12. The illumination device according to claim 1, wherein the light guiding bodies (200) of the optical element (100) are arranged in exactly one row along a straight line (G).

13. A motor vehicle headlight having at least one illumination device in accordance with claim 1.

* * * * *